W. Black,
Bee-Hive.
No. 86,128. Patented Jan. 26. 1869.

WILLIAM BLACK, OF HARRISBURG, PENNSYLVANIA.

Letters Patent No. 86,128, dated January 26, 1869.

IMPROVEMENT IN BEE-HIVES.

The Schedule referred to in these Letters Patent and making part of the same.

*To all whom it may concern:*

Be it known that I, WILLIAM BLACK, of the city of Harrisburg, county of Dauphin, and State of Pennsylvania, have invented a new and useful Improvement in "Bee-Boxes;" and I hereby certify that the following is a full, clear, and exact description of the same, reference being had to the annexed drawings, making a part of this specification, in which—

The object of this invention is to provide a secure and adequate protection against the depredations of moth, grubs, and robber-bees. This is accomplished, in an effectual manner, substantially as is hereinafter shown.

Figure 1:
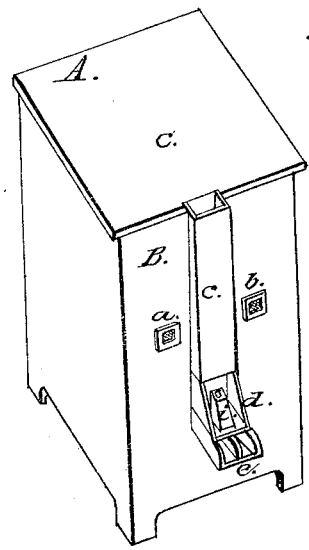
Figure 1 represents a perspective view of the improvement.
Figure 2:
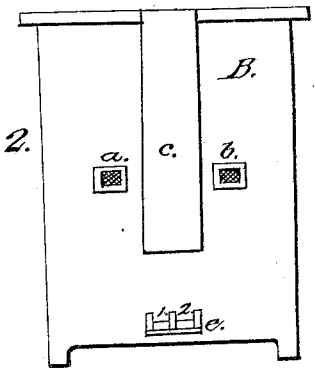
Figure 2 is a front elevation of the box.
Figure 3:
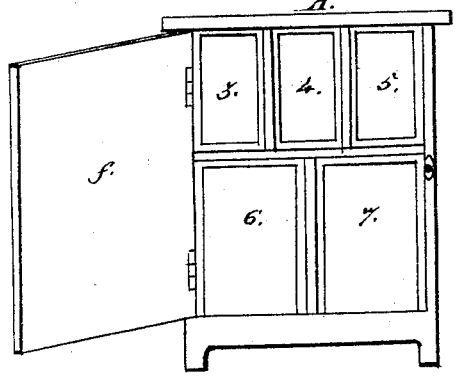
Figure 3 is a rear elevation.

In the drawings, figs. 1, 2, and 3, the box is shown. It is made rectangular in form, substantially as shown, and is provided with the removable boxes usual to this style of hive. Their manner of arrangement is plainly seen in fig. 3; 3, 4, 5, 6, and 7, representing the ends of said boxes. A door is also provided, for convenience of access to and removal of the said boxes.

In figs. 1 and 2, B represents the front of the box. At a proper distance from the lower edge, on said front, proper-sized openings, 1, 2, (see fig. 2,) are formed or cut through the body of the box. These are intended for entrance and exit-passages for the bees.

Immediately in front of said passages the platform, or alighting-board, e, is attached. This is intended, as its name indicates, to furnish a portal or threshold upon which the bees may alight before entering the hive. It also is designed to support or hold in proper position the protector, or portal-guard, d. (See fig. 1.)

This protector constitutes the main feature of my invention. It is constructed of wood, or other suitable material, and is made substantially as follows:

Two sides are formed, wider at the base than the top, as shown in fig. 1. These are attached to a bottom, or base-piece, and a back-piece is next attached. Said back-piece has continuations formed upon it, as is shown at 1', 2', fig. 4. These parts (1', 2') are intended to act as doors, to close up the passages 1, 2, that communicate with the interior of the hive.

Figure 4:
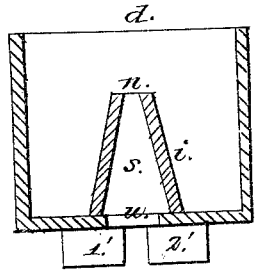
Figure 4 is an enlarged sectional view of the portion that constitutes the main feature of the invention.

The bottom-piece of the protector d has a passage-way, u, formed in it, as shown in fig. 4.

Upon said bottom-piece, in the interior of the protector d, is placed the box i. It occupies a position immediately over the passage u. It is given the form of the frustum of a pyramid, as is shown in fig. 1.

It is made hollow, and has an opening, n, (see fig. 4,) formed in the top. This is intended to allow the obnoxious insects or grubs, that may attempt to gain access to the hive, to enter the protector d.

The front of the protector is glazed, or has a piece of isinglass inserted, to permit the exposure of the interior.

As before stated, this protector is placed upon the ledge or foot-board e, so that the projections 1', 2' will cover up the entrance to the bee-box.

Immediately over the protector a pipe or flue, c, is attached to the bee-box. This pipe c is hollow, and communicates with the open top of protector d when it is in position. It is intended to furnish a passage for such intruders as may have entered the protector.

The interior walls of this pipe c may be coated with tar or bird-lime, so as to hold the moth that may enter it, thus providing for their destruction.

Upon each side of the pipe c, the ventilators a b are placed, to furnish air to the hive.

The intention of the above-described device is to prevent depredations at night, the protector being placed in proper position, in the evening, after the bees are all home, and, as is plainly evident, will effectually prevent the ingress of any depredating insect or grub.

I would state that I do not desire to claim the construction of the bee-box itself, as similar devices are now in use; but What I do claim as new, of my invention, and desire to secure by Letters Patent of the United States, is—

The combination and arrangement of the peculiarly-constructed hive-protector d with the flue-pipe c and bee-box, substantially as and for the purpose herein set forth.

Witnesses:    WILLIAM BLACK. [L. S.]
A. C. SMITH,
WM. P. PATTON.